(12) United States Patent
Dreibine et al.

(10) Patent No.: US 12,006,044 B2
(45) Date of Patent: Jun. 11, 2024

(54) HEAT EXCHANGER OF AN AIR-CONDITIONING SYSTEM OF A CABIN OF AN AIRCRAFT, AND SYSTEM COMPRISING SUCH A HEAT EXCHANGER

(71) Applicant: LIEBHERR-AEROSPACE TOULOUSE SAS, Toulouse (FR)

(72) Inventors: Lamia Dreibine, Toulouse (FR); Luc Xenard, Toulouse (FR); Jérôme Jacquart, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 330 days.

(21) Appl. No.: 17/639,821

(22) PCT Filed: Sep. 2, 2020

(86) PCT No.: PCT/EP2020/074493
§ 371 (c)(1),
(2) Date: Mar. 2, 2022

(87) PCT Pub. No.: WO2021/043839
PCT Pub. Date: Mar. 11, 2021

(65) Prior Publication Data
US 2022/0242579 A1    Aug. 4, 2022

(30) Foreign Application Priority Data

Sep. 2, 2019 (FR) ...................... 1909639

(51) Int. Cl.
*B64D 13/06* (2006.01)
*B60H 1/00* (2006.01)
*B60H 3/06* (2006.01)

(52) U.S. Cl.
CPC ......... *B64D 13/06* (2013.01); *B60H 1/00335* (2013.01); *B60H 2003/0691* (2013.01);
(Continued)

(58) Field of Classification Search
CPC ............ B64D 13/06; B64D 2013/0651; B64D 2013/0685; B60H 1/00335;
(Continued)

(56) References Cited

U.S. PATENT DOCUMENTS

| 4,665,973 | A | * | 5/1987 | Limberg | ................. | F24F 13/30 |
|---|---|---|---|---|---|---|
| | | | | | | 62/402 |
| 5,151,022 | A | * | 9/1992 | Emerson | .................. | B60H 3/06 |
| | | | | | | 62/401 |
| 2005/0191223 | A1 | * | 9/2005 | Collins | .................. | B64D 13/06 |
| | | | | | | 422/177 |

FOREIGN PATENT DOCUMENTS

FR          2037366 A5    12/1970

* cited by examiner

*Primary Examiner* — Emmanuel E Duke
(74) *Attorney, Agent, or Firm* — CRGO Global; Steven M. Greenberg

(57) ABSTRACT

Heat exchanger of an air-conditioning system of a cabin of a transport vehicle, comprising: a primary circuit supplied by a first air flow, a secondary circuit supplied by a second air flow, a casing defining an air-circulation enclosure, a primary circuit inlet box allowing entry into said air-circulation enclosure, and a primary circuit outlet box allowing exit from the air-circulation enclosure, characterized in that said inlet box is mounted removably on said casing, and in that it houses a three-dimensional structure forming a catalytic and/or adsorbent support for treating the air of said primary circuit, and a means for distributing said first air flow into said heat-exchange matrix.

7 Claims, 2 Drawing Sheets

(52) U.S. Cl.
CPC ............... *B64D 2013/0651* (2013.01); *B64D 2013/0685* (2013.01)

(58) Field of Classification Search
CPC ........ B60H 2003/0691; B01D 53/0407; B01D 53/343; B01D 53/8668; B01D 53/88; B01D 53/8675; B01D 2253/1124; B01D 2255/102; B01D 2255/20707; B01D 2255/2073; B01D 2255/92; B01D 2257/106; B01D 2257/708; B01D 2258/06; B01D 2259/4575; F24F 8/167; F24F 8/98; F24F 13/28; F24F 13/30; F24F 3/16; F28D 9/00; F28D 9/02; F28D 2021/0068; F28D 2021/008; F28D 2021/0021; F28F 2280/02; Y02T 50/50
See application file for complete search history.

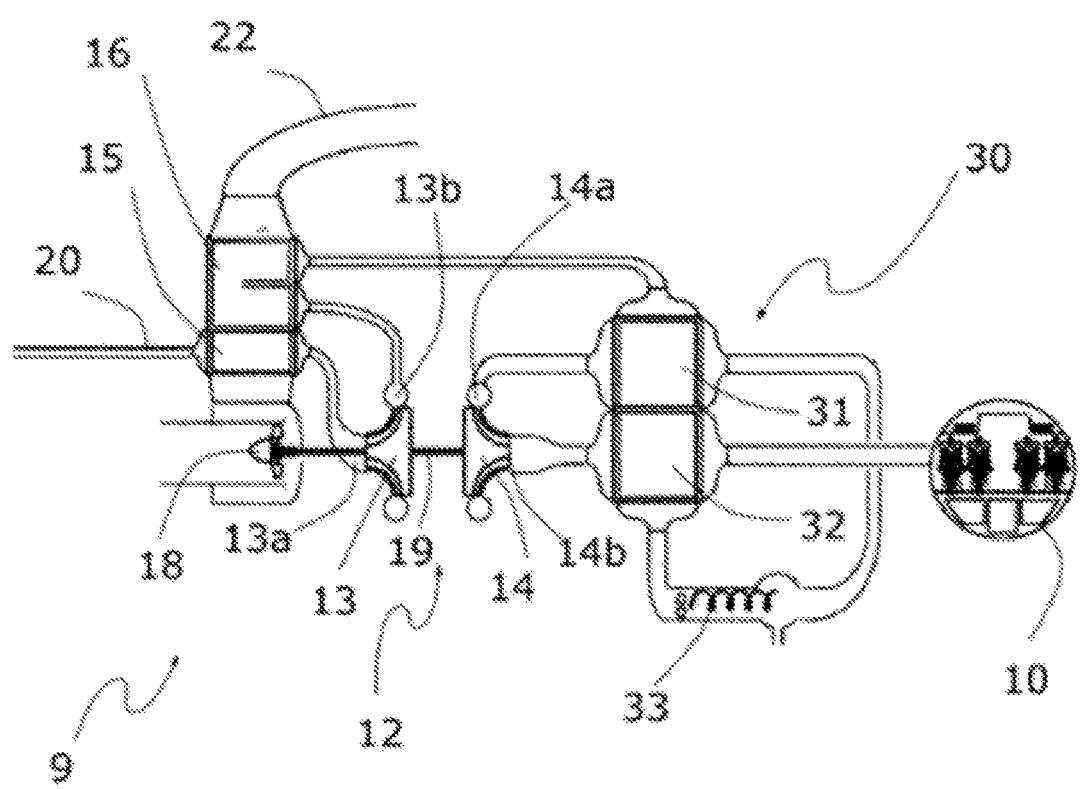
[Fig. 1]

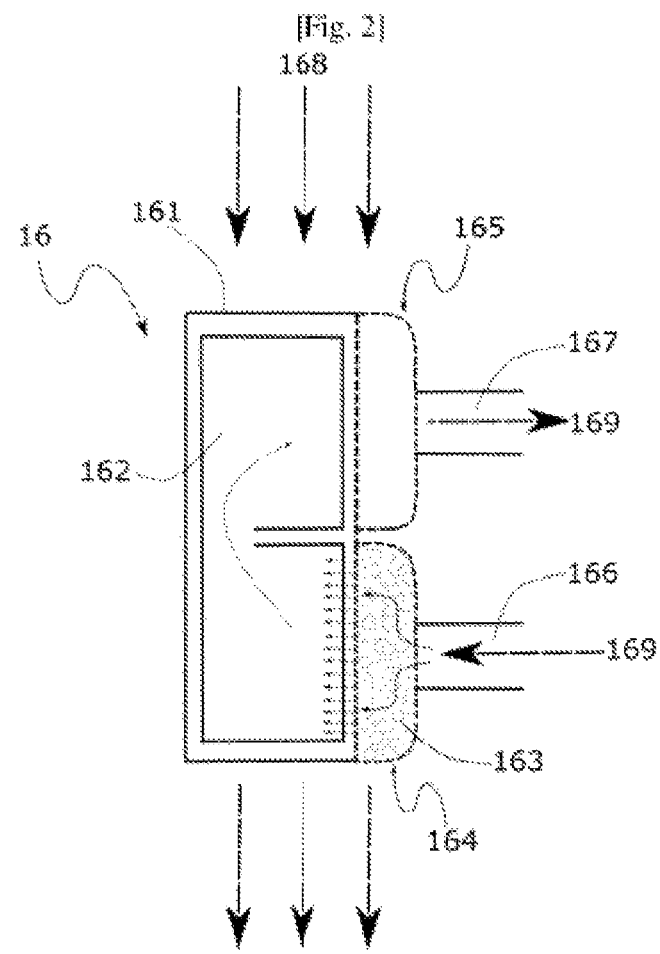
[Fig. 2]
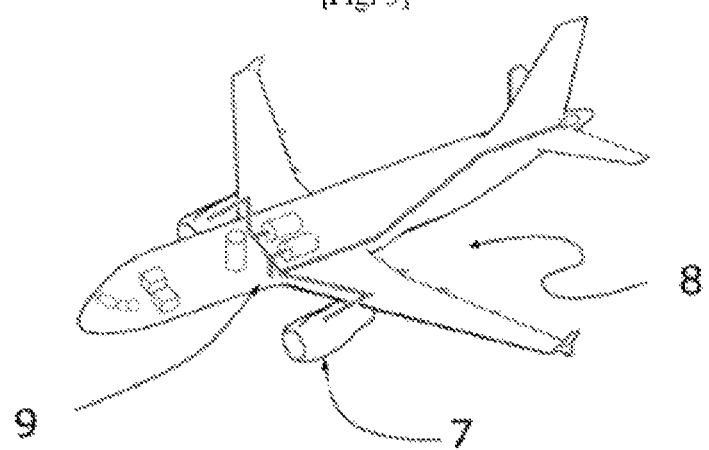
[Fig. 3]

HEAT EXCHANGER OF AN AIR-CONDITIONING SYSTEM OF A CABIN OF AN AIRCRAFT, AND SYSTEM COMPRISING SUCH A HEAT EXCHANGER

CROSS-REFERENCE TO RELATED APPLICATIONS

This application is a § 371 national phase entry of International Application No. PCT/EP2020/074493, filed Sep. 2, 2020, which claims priority to French Patent Application No. 1909639 filed on Sep. 2, 2019.

TECHNICAL FIELD OF THE INVENTION

The invention relates to a heat exchanger of an air-conditioning system. The invention also relates to an air-conditioning system for a cabin of an aircraft, which system is equipped with such a heat exchanger.

TECHNOLOGICAL BACKGROUND

An air-conditioning system for a cabin of a transport vehicle, for example an aircraft, is intended to provide the aircraft cabin (which generally refers to any interior space of the aircraft in which the pressure and/or temperature must be controlled, such as a passenger cabin, the cockpit, a hold, etc.) with air at a controlled pressure and/or temperature. Throughout the text, the term "turbine" denotes a rotary device for using the kinetic energy of the air to rotate a shaft supporting the blades of the turbine. The term "compressor" denotes a rotary device for increasing the pressure of the air that said device receives at the inlet.

An air-conditioning system for a cabin of an aircraft comprises, in a known manner, a device for bleeding compressed air from at least one compressor of an engine of the aircraft (such as a propulsion engine or an auxiliary engine of the aircraft).

Such a known air-conditioning system also comprises an air cycle turbine engine comprising at least one compressor and a turbine mechanically coupled to one another, said compressor comprising an air inlet connected to said compressed-air bleed device, and an air outlet, and said turbine comprising an air inlet and an air outlet that is connected to said cabin in order to be able to supply said cabin with air at a controlled pressure and temperature.

According to an alternative, the compressor of the air cycle turbine engine is directly supplied with ambient air drawn from outside the aircraft, and the air is compressed directly by the compressor of the air cycle turbine engine.

Compressed air contains ozone and other pollutants such as volatile organic compounds, also known as VOCs. In addition, the concentration of ozone and pollutants is substantial when the compressed air is drawn from a certain altitude, and air containing ozone may cause eye irritation and respiratory and cardiovascular discomfort for passengers in the cabin supplied by this air.

Air-conditioning systems today commonly use ozone converters to remove ozone and pollutants from the air before they are introduced into the cabin. An ozone converter is in the form of a catalytic cartridge and is arranged in an air-conditioning system.

Moreover, the ozone converter is a part that may be integrated into the pipes of an air-conditioning circuit to treat the air that supplies the cabin. This takes up space within the air-conditioning system and increases the weight of the aircraft.

The inventors have therefore sought a new solution which involves reducing the size and the on-board mass of an air-conditioning system.

The inventors have in particular sought an air treatment system that can be used not only in the context of the air-conditioning systems of a transport vehicle such as an aircraft, but also in all types of bleed systems that require polluted air containing ozone and pollutants to be treated before being distributed in the cabin, or all types of bleed systems that may treat the air at the inlet of the environmental control system.

AIMS OF THE INVENTION

The invention aims to provide an air-conditioning system that contributes to overcoming at least certain drawbacks of the known solutions.

The invention aims in particular to provide, in at least one embodiment, an air-conditioning system that contributes to reducing the size and the mass on board a transport vehicle.

The invention also aims to provide, in at least one embodiment, an air-conditioning system that contributes to treating the air supplying a cabin of a transport vehicle.

The invention also aims to provide, in at least one embodiment, an air-conditioning system that facilitates the maintenance of such a system.

DISCLOSURE OF THE INVENTION

To do this, the invention relates to a heat exchanger of an air-conditioning system of a cabin of a transport vehicle, comprising:
- a primary circuit supplied by a first air flow, called the hot air flow,
- a secondary circuit supplied by a second air flow, called the cold air flow,
- a casing defining an air-circulation enclosure in which a heat-exchange matrix is housed between said primary circuit and said secondary circuit,
- an inlet box allowing the primary circuit to enter into said air-circulation enclosure,
- an outlet box allowing the primary circuit to exit from the air-circulation enclosure.

The heat exchanger according to the invention is characterized in that said inlet box is mounted removably on said casing and in that it houses a three-dimensional structure forming a catalytic and/or adsorbent support for treating the air of said primary circuit, and a means for uniformly distributing said first air flow into said heat-exchange matrix.

The heat exchanger according to the invention therefore has the particular feature of being able to treat the air circulating in the heat-exchange matrix of the exchanger and of uniformly distributing the air within this matrix in order to improve the heat exchange between the primary circuit and the secondary circuit.

"Three-dimensional structure" means a structure which forms a catalytic and/or adsorbent support and of which the geometric surface (exchange surface) to volume ratio is high.

The main advantage of such a three-dimensional structure lies in its dual function of distributing the air flow evenly and treating polluted air. Indeed, the air conveyed by the primary circuit is distributed through the three-dimensional structure such that it is introduced uniformly into the inlet of the circulation enclosure. Using such a three-dimensional structure also allows the exchange surface between the catalytic and/or adsorbent support and the air supplying the primary circuit to be increased. This allows the heat exchange between the catalytic and/or adsorbent support and the air of the primary circuit to be improved, and saves space.

Said three-dimensional structure forms a catalytic and/or adsorbent substrate comprising a catalyst that makes it possible to convert ozone and treat the pollutants contained in the air which is conveyed by the primary circuit and circulates in the circulation enclosure of said heat exchanger and/or an adsorbent that makes it possible to adsorb uncatalyzed pollutants. The ozone contained in the air is harmful; it is therefore essential to convert it using a catalytic substrate that allows it to be transformed into the dioxygen necessary for the reactions involved in respiration.

Ozone is converted catalytically, with the active sites transforming the ozone molecules into oxygen free radicals, which in turn reform respirable dioxygen molecules, for example as described in patent GB 2009392 A.

Pollutants and in particular volatile organic compounds (VOC) include hydrocarbons, which are the source of unpleasant odors such as the smell of fuel in the cabin during take-off or during flight. VOCs are involved in the process of ozone formation together with nitrogen oxide and are also used in the composition of fuel, which explains their high quantity in the air and more particularly in the lower atmosphere. The catalytic and/or adsorbent support in the form of a three-dimensional structure promotes the conversion of ozone into dioxygen and treats the pollutants and in particular the VOCs.

The pollutants can be treated:
a. by trapping some of the pollutants, preferably the VOCs, on the three-dimensional structure by chemisorption, so that the pollutants, preferably the VOCs, are adsorbed on the three-dimensional structure without being transformed; and/or
b. thermal-catalytically, by means of which the remaining pollutants, preferably the remaining VOCs, undergo mineralization by the simultaneous action of a catalyst and a high temperature, of the order of 300° C., in order to transform the pollutants into carbon dioxide.

In other words, said three-dimensional structure is suitable for converting ozone and treating the volatile organic compounds contained in the air supplying the primary circuit.

In addition, the inlet box of the primary circuit supplying the circulation enclosure is removably mounted such that said inlet box may be detached, with the aim of being removed, from the casing delimiting the circulation enclosure of the heat exchanger through a reversible attachment system. The reversible attachment system may be a screwing system, an elastic interlocking mechanism from a clip, or any other system that allows the inlet box to be removably mounted on the casing. "Inlet box" means a hopper or a box delimiting a volume in which said three-dimensional structure is housed.

The detachable inlet box is of interest during maintenance. Indeed, the maintenance frequency of an ozone converter as described in the prior art is higher than the maintenance frequency of an exchanger. Given that the inlet box is detachable, the maintenance of the three-dimensional structure may be carried out without necessarily carrying out maintenance on the exchanger.

Consequently, the installation and maintenance of the three-dimensional structure housed in said inlet box is thus facilitated. In fact, this three-dimensional structure may also be easily removed in order to be changed.

In addition, integrating a three-dimensional structure according to the invention into an inlet box of the heat exchanger makes it possible to reduce the number of interfaces and fasteners arranged on the structure of the aircraft, which contributes to making the latter lighter and therefore more economical in terms of fuel consumption.

More particularly, a heat exchanger according to the invention is for example arranged in a channel for the circulation of ram air drawn from the outside of an aircraft. It is for example a main cooling exchanger of an air-conditioning system better known by the acronym MHX (main heat exchanger) or a primary cooling exchanger better known by the acronym PHX (primary heat exchanger).

Advantageously and according to the invention, said three-dimensional structure is a metal foam coated with a catalyst.

According to this variant, said three-dimensional structure is in the form of a metal foam structured like a catalyst. Said foam has, for example, a cellular structure with a macroscopic shape comprising cells delimited by edges. The cells and the edges of the cellular structure are arranged irregularly, thus causing a disturbance in the circulation of the air flow. The cellular structure therefore allows an increased exchange surface between the catalytic and/or adsorbent support formed by said foam and the air circulating in the inlet box.

Said cells of the foam, defined by the spaces of the cellular structure allowing the passage of air, both allow uniform distribution of the air in the air-circulation enclosure and ensure good thermal conductivity.

Moreover, said edges, defined by the structure surrounding the cells, allow increased turbulence of the air flow in the catalytic bed, defined by the volume occupied by said catalytic support. In addition, the increase in turbulence consequently leads to an increase in the contact time between the polluted air and the surface of said catalyst.

The catalyst is deposited on the metal foam so as to allow the conversion of ozone into dioxygen and to treat certain pollutants such as volatile organic compounds contained in the air circulating in the circulation enclosure of said heat exchanger.

Said catalyst comprises an active phase consisting of one or more noble metals, for example platinum group metals (PGM), deposited on mixed metal oxides such as manganese oxide, titanium oxide, alumina, etc.

The foam is for example made up of various materials known to those skilled in the art, such as ceramics (oxide or carbide mixtures) or a metal such as aluminum or its alloys, for example FeCrAl. Said material forming the foam is porous (macro-, meso- or microporous) to allow better exchange between the polluted air and the treatment surface.

The advantage of a metal or ceramic foam lies in its ability to ensure or maintain the isothermality of the catalytic bed.

Advantageously and according to the invention, said three-dimensional structure is a ceramic foam coated with a catalyst.

According to this variant, said three-dimensional structure is in the form of a ceramic foam that has good stability during exposure to high temperatures in an oxidizing atmosphere.

In addition, a metal or ceramic foam is adjustable and can thus be adapted to any type of inlet or outlet box shape. Thus, it can be easily integrated into and removed from said inlet box without difficulty. Said inlet box may also have different shapes, given that the three-dimensional structure is adjustable, so as to adapt to the inlet or outlet box.

Advantageously and according to the invention, said outlet box is removably mounted on said casing and also houses a three-dimensional structure forming a catalytic and/or adsorbent support for treating the air of said primary circuit.

According to this variant, said three-dimensional structure is also housed in the outlet box so as to treat the air for ozone and pollutants at the outlet of the heat exchanger.

In addition, the outlet box is removably mounted on said casing in order to be able to be detached from the casing delimiting the circulation enclosure and thus facilitate maintenance of the three-dimensional structure housed in the outlet box.

Thus, the presence of a three-dimensional structure at the inlet and at the outlet of the exchanger allows increased exchange surfaces between the first air flow and the catalytic and/or adsorbent support, and in particular improved heat exchange and therefore treatment of the air leaving the exchanger.

Advantageously and according to the invention, the type of catalytic and/or adsorbent support housed in the inlet box may be different from the type of catalytic and/or adsorbent support housed in the outlet box in order to be able to treat different types of volatile organic compounds. Indeed, the second catalytic and/or adsorbent support housed in the outlet box may be more selective with respect to volatile organic compounds so as to improve the treatment of the air and therefore the quality of the air.

Advantageously and according to the invention, said three-dimensional structure is defined by open cells sized between 5 and 10 PPI.

According to this variant, the three-dimensional structure is formed by a foam that comprises open cells forming an interconnected network. The size of the cells is expressed in PPI (pores per inch; one inch is considered equivalent to 25.4 millimeters (mm)). Thus, the size of the cells may be between 5 and 50 PPI, i.e. between 5 and 50 pores per 25.4 mm, preferably between 10 PPI and 30 PPI (between 10 and 30 pores per 25.4 mm), and even more preferably of the order of 20 PPI (20 pores per 25.4 mm).

The advantage of such a three-dimensional structure lies in its lighter weight, since it is not a solid monolithic structure. Thus, this three-dimensional structure saves weight, but also saves space since it is housed in an inlet box of a heat exchanger.

The invention also relates to an air-conditioning system of a cabin of a transport vehicle, the system comprising at least one heat exchanger according to the invention.

The advantages and effects of a heat exchanger according to the invention apply, mutatis mutandis, to an air-conditioning system according to the invention.

The invention also relates to an air transport vehicle comprising at least one propulsion engine, a cabin and at least one air-conditioning system for said cabin, characterized in that the air-conditioning system of the cabin is a system according to the invention.

The advantages of an air-conditioning system according to the invention apply, mutatis mutandis, to an air or rail transport vehicle according to the invention.

The invention also relates to a heat exchanger, an air-conditioning system and an air transport vehicle that are characterized in combination by all or some of the features mentioned above or below.

LIST OF FIGURES

Further aims, features and advantages of the invention can be found in the following description, which is provided solely as a non-limiting example, and which refers to the accompanying figures, in which:

FIG. 1 is a schematic view of an air-conditioning system according to an embodiment of the invention, FIG. 2 is a schematic sectional view of a heat exchanger according to an embodiment of the invention, FIG. 3 is a schematic perspective view of an aircraft according to an embodiment of the invention.

DETAILED DESCRIPTION OF ONE EMBODIMENT OF THE INVENTION

For the sake of illustration and clarity, the drawings do not strictly adhere to scales and proportions. Throughout the detailed description that follows with reference to the drawings, unless otherwise indicated, each element of the heat exchanger is described as it is arranged when the exchanger is housed in a ram-air circulation channel of an air-conditioning system for a cabin of an aircraft and supplied with hot air from an external air bleed device (such as a device for bleeding air from a compressor of a propulsion engine of the aircraft), and with air at ram pressure drawn from outside the aircraft from a scoop.

Throughout the following description, it is thus considered that the heat exchanger is installed within an air-conditioning system, it being understood that the heat exchanger according to the invention can be used for applications other than cooling high-temperature air that is bled, for example, from a propulsion engine of an aircraft. Said exchanger can in particular be provided in an air-conditioning system of a rail vehicle.

Finally, identical, similar or analogous elements are denoted using the same reference signs throughout the drawings.

FIG. 1 schematically illustrates an air-conditioning system for an aircraft cabin, the system incorporating a heat exchanger according to the invention. FIG. 2 schematically illustrates an exchanger for cooling a hot primary circuit by means of a cold secondary circuit.

FIG. 1 schematically shows an air-conditioning system 9 for a cabin 10 of an aircraft 8, comprising an air cycle turbine engine 12 that comprises a compressor 13 and an expansion turbine 14 mechanically coupled to one another by a mechanical shaft 19. This mechanical shaft 19 also drives a fan 18.

The compressor 13 comprises an air inlet 13*a* connected to a device for bleeding air from an air source (not shown in the figures for the sake of clarity) by means of a primary cooling exchanger, also referred to as a PHX (primary heat exchanger) exchanger 15 throughout the following, and a pipe 20 fluidically connecting the air bleed device and the PHX exchanger 15.

In other words, the air from the air bleed device, which is for example a device for bleeding air from a compressor of a propulsion engine 7 of the aircraft or a device for bleeding air from a compressor of an auxiliary engine of the aircraft, or a device for drawing air from a scoop of the aircraft, whether or not associated with an intermediate compressor, supplies the compressor 13 of the air cycle turbine engine 12 after passing through a primary PHX exchanger 15. This PHX exchanger 15 comprises a primary circuit formed by the air fed from the air bleed device via the pipe 20, and a secondary circuit supplied with air at ram pressure, which circulates in a channel 22 for the circulation of ram air, hereinafter referred to as the ram-air channel.

The ram-air circulation in the ram-air channel 22 is provided by the fan 18 mounted on the shaft 19 of the air cycle turbine engine, which shaft extends into the ram-air channel 22. According to other alternatives, the fan 18 can be separate from the shaft 19 and rotated by an independent electric motor.

The compressor 13 also comprises an air outlet 13b fluidically connected to a main cooling exchanger, also referred to by the acronym MHX (main heat exchanger) 16 throughout the following, which is arranged in the channel 22 for the circulation of ram air drawn from outside the aircraft.

This MHX exchanger 16 comprises for example, and as shown in FIG. 2, a hot primary circuit supplied with the air flow 169 from the compressor 13, and a cold secondary circuit, in thermal interaction with the primary circuit, supplied with the cold ram air flow 168 circulating in the ram-air channel 22. In other words, the air 169 from the compressor 13 is cooled, in the MHX exchanger 16, by the ram air 168 circulating in the ram-air circulation channel 22. In addition, the inlet box 164 of this exchanger is detachable and comprises a metal foam 163 allowing the air to be treated for ozone and compounds and also allowing distribution of the air in the circulation enclosure 162 of the MHX heat exchanger 16. The metal foam 163, housed in the inlet box 164 for the air flow 169 of the primary circuit, therefore retains the ozone and the pollutants and allows uniform distribution of the air flow 169 in the circulation enclosure 162 of the MHX exchanger 16.

This uniform air distribution thus improves heat exchange between the air flows of the primary and secondary circuits. In addition, the arrangement of the foam in the inlet box of the exchanger both saves space and facilitates maintenance.

The expansion turbine 14 of the air cycle turbine engine 12 comprises an air inlet 14a supplied with air from the MHX exchanger 16 that has passed through a water extraction loop 30, which will be described below, and an air outlet 14b that is connected to said cabin 10 in order to be able to supply said cabin with air at a controlled pressure and temperature.

The water extraction loop 30 comprises a heater 31 comprising a primary air circuit supplied with air from the main MHX exchanger 16, in thermal interaction with a secondary circuit that is supplied with air from a water extractor 33 and is intended for supplying the inlet 14a of the expansion turbine.

The water extraction loop 30 also comprises a condenser 32 comprising a primary air circuit supplied with the air flow at the outlet of the heater 31, in thermal interaction with a secondary air circuit supplied with the air flow from the expansion turbine 14, to allow condensation of the air flow of the primary circuit.

Finally, the water extraction loop also comprises a water extractor 33 that is arranged at the outlet of the condenser 32 and is designed to be able to recover the water condensed by the condenser and feed said water to a water distribution pipe (not shown in FIG. 1).

FIG. 2 illustrates the distribution of the flow of hot air 169 from the primary circuit within an MHX exchanger 16 housed in a circulation channel 168 for ram air drawn from outside an aircraft. The compressed hot air 169 circulates in the pipe 166 connecting the compressor and the MHX exchanger 16 before entering the inlet box 164 that is removably mounted by screwing on the casing 161 delimiting the circulation enclosure 162 comprising a heat-exchange matrix (not shown). The detachable inlet box 164 comprises a metal foam 163 having cells of sizes between 10 and 30 PPI, allowing the distribution of the hot air 169 within the heat-exchange matrix and the conversion of ozone and pollutants contained in the air through the metal foam. The hot air 169 therefore circulates between the inlet box 164 and the circulation enclosure 162 in a uniform manner owing to the metal foam 163, which distributes the flow evenly. The hot air flow 169 circulates in the circulation enclosure 162 between the inlet box 164 and the outlet box 165, which are respectively connected to an inlet pipe 166 and a hot air flow outlet pipe 167.

According to another embodiment, the outlet box 165 may also be detachable so as to be able to accommodate a metal foam 170 that allows the treatment of the air at the inlet to be completed. The foam 170 housed in the outlet box 165 is used solely for air treatment purposes.

According to another embodiment, the primary circuit conveys a cold air flow and the secondary circuit conveys a hot air flow.

According to another embodiment, the heat exchanger may be adapted to all types of air-conditioning system structures.

The invention claimed is:

1. A Heat exchanger of an air-conditioning system of a cabin of a transport vehicle, comprising: a primary circuit supplied by a first air flow, called the hot air flow, a secondary circuit supplied by a second air flow, called the cold air flow, a casing defining an air-circulation enclosure in which a heat-exchange matrix is housed between said primary circuit and said secondary circuit, an inlet box allowing the primary circuit to enter into said air-circulation enclosure, an outlet box allowing the primary circuit to exit from the air-circulation enclosure, wherein said inlet box is mounted removably on said casing and said inlet box houses a three-dimensional structure forming a catalytic and/or adsorbent support for treating the air of said primary circuit, and a means for uniformly distributing said first air flow into said heat-exchange matrix.

2. The heat exchanger according to claim 1, wherein said three-dimensional structure is a metal foam coated with a catalyst.

3. The heat exchanger according to claim 1, wherein said three-dimensional structure is a ceramic foam coated with a catalyst.

4. The heat exchanger according to claim 1, wherein said outlet box is removably mounted on said casing and also houses a three-dimensional structure forming a catalytic and/or adsorbent support for treating the air of said primary circuit.

5. The heat exchanger according to claim 1, wherein said three-dimensional structure is defined by open cells sized between 5 and 10 PPI.

6. An air-conditioning system of a cabin of a transport vehicle, comprising at least one heat exchanger comprising: a primary circuit supplied by a first air flow, called the hot air flow, a secondary circuit supplied by a second air flow, called the cold air flow, a casing defining an air-circulation enclosure in which a heat-exchange matrix is housed between said primary circuit and said secondary circuit, an inlet box allowing the primary circuit to enter into said air-circulation enclosure, an outlet box allowing the primary circuit to exit from the air-circulation enclosure, wherein said inlet box is mounted removably on said casing and said inlet box houses a three-dimensional structure forming a catalytic and/or adsorbent support for treating the air of said primary circuit, and a means for uniformly distributing said first air flow into said heat-exchange matrix.

7. A transport vehicle, in particular an air transport vehicle, comprising at least one propulsion engine, a cabin and at least one air conditioning system for said cabin, wherein the air-conditioning system for the cabin is an air-conditioning system comprising at least one heat exchanger comprising: a primary circuit supplied by a first air flow, called the hot air flow, a secondary circuit supplied by a second air flow, called the cold air flow, a casing defining an air-circulation enclosure in which a heat-exchange matrix is housed between said primary circuit and said secondary circuit, an inlet box allowing the primary circuit to enter into said air-circulation enclosure, an outlet box allowing the primary circuit to exit from the air-circulation enclosure, wherein said inlet box is mounted removably on said casing and said inlet box houses a three-dimensional structure forming a catalytic and/or adsorbent support for treating the air of said primary circuit, and a means for uniformly distributing said first air flow into said heat-exchange matrix.

* * * * *